(12) United States Patent
Lamparter et al.

(10) Patent No.: US 11,188,037 B2
(45) Date of Patent: Nov. 30, 2021

(54) CONTROLLING METHODS, CONTROL SYSTEMS, AND PLANTS USING SEMANTIC MODELS FOR QUALITY CRITERIA OR ADAPTATION OF CONTROL RULES

(71) Applicant: SIEMENS AKTIENGESELLSCHAFT, Munich (DE)

(72) Inventors: Steffen Lamparter, Feldkirchen (DE); Dragan Obradovic, Ottobrunn (DE); Justinian Rosca, West Windsor, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/083,143

(22) PCT Filed: Mar. 23, 2017

(86) PCT No.: PCT/EP2017/056969
§ 371 (c)(1),
(2) Date: Sep. 7, 2018

(87) PCT Pub. No.: WO2017/162815
PCT Pub. Date: Sep. 28, 2017

(65) Prior Publication Data
US 2019/0113892 A1    Apr. 18, 2019

Related U.S. Application Data

(60) Provisional application No. 62/312,538, filed on Mar. 24, 2016.

(51) Int. Cl.
*G05B 13/04* (2006.01)
*G05B 17/02* (2006.01)

(52) U.S. Cl.
CPC .......... *G05B 13/047* (2013.01); *G05B 17/02* (2013.01)

(58) Field of Classification Search
CPC .......... Y02P 90/22; Y02P 90/04; Y02P 90/02; G05B 19/41875; G05B 17/02;
(Continued)

(56) References Cited

U.S. PATENT DOCUMENTS 5,056,331 A * 10/1991 Lotz ................ B41J 29/13
165/80.3
5,284,164 A * 2/1994 Andrews ........... A24C 5/31
131/280
(Continued)

FOREIGN PATENT DOCUMENTS

CN    103716584 A    4/2014
CN    104932464 A    9/2015
(Continued)

OTHER PUBLICATIONS

Chinese Office Action for Chinese Application No. 201780019100.0 dated Aug. 13, 2020.
(Continued)

*Primary Examiner* — Darrin D Dunn
(74) *Attorney, Agent, or Firm* — Lempia Summerfield Katz LLC (57) ABSTRACT

The controlling method uses a control specification. In the method, at least part of the progression of the controlling process is monitored, and at least one quality criterion characterizing the quality of the control method is determined, (e.g., ascertained), in accordance with the progression. The control specification is adjusted in accordance with the quality criterion.

16 Claims, 5 Drawing Sheets

(58) Field of Classification Search
CPC .. G05B 13/042; G05B 13/048; G05B 19/418; G05B 2219/32194; G05B 2219/32212; G05B 2219/32368; G05B 19/401; G05B 2219/32177; G05B 2219/32182; G05B 2219/32191; G05B 23/024; G05B 19/41805; G05B 2219/32195; G05B 2219/32197; G05B 2219/32198; G05B 2219/37499; G05B 2219/37533; G05B 2219/37576; G05B 2219/40111; G05B 2219/42155

See application file for complete search history.

(56) References Cited

U.S. PATENT DOCUMENTS

| | | | | |
|---|---|---|---|---|
| 5,351,195 | A * | 9/1994 | Sherman | G05B 19/41885 700/100 |
| 5,657,641 | A * | 8/1997 | Cunningham | H05K 7/20536 361/691 |
| 5,661,669 | A * | 8/1997 | Mozumder | G05B 13/042 204/192.13 |
| 5,715,181 | A * | 2/1998 | Horst | H01L 22/20 257/E21.525 |
| 5,790,424 | A * | 8/1998 | Sugihara | G07C 3/00 340/500 |
| 5,942,017 | A * | 8/1999 | Van Winkle, Sr. | B01D 46/00 55/385.1 |
| 6,938,026 | B2 * | 8/2005 | Yundt-Pacheco | G16H 10/40 706/47 |
| 7,082,348 | B1 * | 7/2006 | Dahlquist | G05B 13/048 162/232 |
| 7,176,475 | B2 * | 2/2007 | Fujii | G01N 21/88 250/559.45 |
| 7,209,846 | B2 * | 4/2007 | Tamaki | G06Q 10/06 702/84 |
| 7,272,532 | B2 * | 9/2007 | Shafer | G06Q 10/06 702/183 |
| 7,324,862 | B2 * | 1/2008 | Sugihara | G06Q 10/06 700/109 |
| 7,398,179 | B2 * | 7/2008 | Agapiou | G01B 21/04 702/155 |
| 7,493,185 | B2 * | 2/2009 | Cheng | G05B 19/41875 700/108 |
| 7,571,149 | B1 * | 8/2009 | Yanosy, Jr. | G06F 8/10 706/52 |
| 8,423,952 | B2 * | 4/2013 | Bogl | G06Q 10/06 717/105 |
| 8,594,828 | B2 * | 11/2013 | Stephenson | G05B 13/048 162/198 |
| 9,171,254 | B2 * | 10/2015 | Cescolini | G06N 5/00 |
| 9,182,758 | B1 * | 11/2015 | Dunlop | G01B 21/30 |
| 9,471,891 | B2 * | 10/2016 | Wong | G06Q 10/06395 |
| 9,677,777 | B2 * | 6/2017 | Karamanos | F24F 13/04 |
| 10,295,994 | B2 * | 5/2019 | Dunlop | G01B 21/30 |
| 10,303,148 | B2 * | 5/2019 | Aparicio Ojea | G05B 19/4183 |
| 2001/0048760 | A1 * | 12/2001 | Bett | G06T 7/0004 382/141 |
| 2002/0026257 | A1 * | 2/2002 | Newmark | G05B 19/41805 700/108 |
| 2002/0055925 | A1 * | 5/2002 | Kondo | G05B 19/41875 |
| 2003/0040948 | A1 * | 2/2003 | Sakaguchi | G05B 19/41875 705/7.41 |
| 2003/0097197 | A1 * | 5/2003 | Parent | G05B 13/042 700/108 |
| 2003/0146289 | A1 * | 8/2003 | Sekhar | F24F 3/0442 236/49.3 |
| 2003/0229464 | A1 * | 12/2003 | Takanabe | H01L 22/20 702/84 |
| 2004/0058637 | A1 * | 3/2004 | Laiti | B01D 46/0028 454/229 |
| 2005/0083649 | A1 * | 4/2005 | Behrens | G06F 1/182 361/679.48 |
| 2005/0246045 | A1 * | 11/2005 | Sugihara | G06Q 10/06 700/109 |
| 2005/0288812 | A1 * | 12/2005 | Cheng | G05B 19/41875 700/109 |
| 2006/0047454 | A1 * | 3/2006 | Tamaki | G06Q 10/06 702/84 |
| 2006/0102858 | A1 * | 5/2006 | Fujii | G01N 21/88 250/559.45 |
| 2006/0116778 | A1 * | 6/2006 | Chiang | G05B 15/02 700/51 |
| 2006/0242116 | A1 * | 10/2006 | Ahmed | G06Q 10/06 |
| 2007/0137318 | A1 * | 6/2007 | Desrochers | G01N 1/26 73/863.81 |
| 2007/0274858 | A1 * | 11/2007 | Childers | A61L 2/208 422/28 |
| 2008/0087039 | A1 * | 4/2008 | Reed | B64D 11/02 62/498 |
| 2008/0243927 | A1 * | 10/2008 | Langen | G06Q 10/00 |
| 2008/0278912 | A1 * | 11/2008 | Zavadsky | H04Q 1/02 361/697 |
| 2008/0288198 | A1 * | 11/2008 | Francino | F01K 13/02 702/84 |
| 2008/0300709 | A1 * | 12/2008 | Collette, III | G05B 13/027 700/103 |
| 2009/0086428 | A1 * | 4/2009 | Campbell | H05K 7/2079 361/694 |
| 2009/0234640 | A1 * | 9/2009 | Boegl | G06F 8/10 704/9 |
| 2009/0276075 | A1 * | 11/2009 | Good | G07C 3/146 700/110 |
| 2010/0078157 | A1 * | 4/2010 | Roth | H05K 7/20745 165/104.34 |
| 2010/0079940 | A1 * | 4/2010 | Mongia | G06F 1/20 361/679.49 |
| 2010/0082120 | A1 * | 4/2010 | Stephenson | G05B 13/048 700/29 |
| 2010/0083215 | A1 * | 4/2010 | Bogl | G06F 8/10 717/105 |
| 2010/0110634 | A1 * | 5/2010 | Woodbury, II | H05K 7/20436 361/698 |
| 2010/0198387 | A1 * | 8/2010 | Satonaga | G05B 23/0251 700/109 |
| 2010/0198556 | A1 * | 8/2010 | Kost | G05B 23/0221 702/183 |
| 2010/0229151 | A1 | 9/2010 | Yuan et al. | |
| 2011/0277967 | A1 * | 11/2011 | Fried | F28D 15/0266 165/104.26 |
| 2012/0071082 | A1 * | 3/2012 | Karamanos | F24F 5/0003 454/284 |
| 2012/0078410 | A1 * | 3/2012 | Wong | G06Q 10/06395 700/110 |
| 2012/0100794 | A1 * | 4/2012 | Redshaw | G06F 1/206 454/184 |
| 2012/0118327 | A1 * | 5/2012 | Mazmanyan | B08B 5/04 134/21 |
| 2012/0123990 | A1 * | 5/2012 | Eckardt | G06F 8/10 706/47 |
| 2012/0130520 | A1 * | 5/2012 | Parikh | G05B 19/41875 700/96 |
| 2012/0136470 | A1 * | 5/2012 | Deans | G05B 19/41875 700/110 |
| 2012/0253869 | A1 * | 10/2012 | Ansley | G06Q 10/06 705/7.12 |
| 2013/0030554 | A1 * | 1/2013 | Macarthur | G05B 13/048 700/29 |
| 2013/0068441 | A1 * | 3/2013 | Campbell | H05K 7/20145 165/249 |
| 2013/0080125 | A1 * | 3/2013 | Baseman | G05B 19/41875 703/2 |
| 2013/0213082 | A1 * | 8/2013 | Woodbury, II | H05K 7/20436 62/498 |
| 2013/0297548 | A1 * | 11/2013 | Cescolini | G06N 5/00 706/46 |
| 2014/0022093 | A1 * | 1/2014 | Hubauer | G05B 19/4183 340/870.02 |

(56) References Cited

U.S. PATENT DOCUMENTS

| | | | | |
|---|---|---|---|---|
| 2014/0032555 | A1* | 1/2014 | Kiff | G05B 19/042 707/737 |
| 2014/0156051 | A1* | 6/2014 | Miquel | G05B 19/401 700/110 |
| 2014/0249655 | A1* | 9/2014 | Nystrom | G05B 23/0297 700/32 |
| 2014/0287671 | A1* | 9/2014 | Slessman | F28F 9/0265 454/184 |
| 2015/0006432 | A1* | 1/2015 | Grosset | G06Q 10/067 705/348 |
| 2015/0113927 | A1* | 4/2015 | Wright | A61L 2/208 55/385.2 |
| 2015/0128483 | A1* | 5/2015 | Krupp | F24H 3/025 43/132.1 |
| 2015/0324329 | A1* | 11/2015 | Blevins | G05B 17/02 703/2 |
| 2015/0369706 | A1* | 12/2015 | Miller | G01N 1/2205 73/863.23 |
| 2016/0054720 | A1* | 2/2016 | Lo | G05B 19/056 700/87 |
| 2016/0092820 | A1* | 3/2016 | Ebel | G05B 17/02 705/7.41 |
| 2016/0202691 | A1* | 7/2016 | Pettersson | G05B 19/4184 700/98 |
| 2016/0281348 | A9* | 9/2016 | Karamanos | F24F 5/0003 |
| 2016/0312552 | A1* | 10/2016 | Early | G05B 13/041 |
| 2017/0011301 | A1* | 1/2017 | Moitra | G06N 5/046 |
| 2017/0017221 | A1* | 1/2017 | Lamparter | G05B 19/056 |
| 2017/0060972 | A1* | 3/2017 | McHugh | G06F 16/258 |
| 2017/0091347 | A1* | 3/2017 | Geipel | G05B 19/0426 |
| 2017/0136702 | A1* | 5/2017 | Giulietti | B33Y 50/00 |
| 2018/0137424 | A1* | 5/2018 | Gabaldon Royval | G06N 5/022 |
| 2018/0173209 | A1* | 6/2018 | Iseli | G01B 21/04 |
| 2018/0218296 | A1* | 8/2018 | Feiten | G06Q 10/06315 |
| 2018/0307214 | A1* | 10/2018 | Lamparter | G05B 19/4186 |
| 2018/0365620 | A1* | 12/2018 | Paeme | G06Q 10/06395 |
| 2019/0114549 | A1* | 4/2019 | Olsher | G06N 5/04 |
| 2019/0196445 | A1* | 6/2019 | Lee | G05B 19/418 |
| 2019/0271971 | A1* | 9/2019 | Dunlop | G05B 19/41875 |

FOREIGN PATENT DOCUMENTS

| | | |
|---|---|---|
| CN | 105243080 A | 1/2016 |
| WO | WO03071455 A2 | 8/2003 |

OTHER PUBLICATIONS

PCT International Search Report and Written Opinion of International Searching Authority dated Jul. 13, 2017 corresponding to PCT International Application No. PCT/EP2017/056969 filed Mar. 23, 2017.

Rohit S. Patwardhan and Michel Ruel, "Best Practices for Monitoring your PID Loops—The Key to Optimizing Control Assets", http://www.topcontrol.com/fichiers/en/Best_Practices_for_Monitoring_your_PID_loops_.pdf; pp. 1-4, 2008.

Ashari, Alireza Esna, and Eric Feron. "Formally expressing the semantics of observer-based fault detection software." https://pdfs.semanticscholar.org/6757/afd60b8f93a679ef4e3b9857f1e0a9560cf8.pdf; pp. 1-37, 2013.

Ghandakly Adel A et al: "Enhancement of Exiting PLC's With an Adaptive Control Technique", Record of the Industry Applications Conference (IAS). Orlando, Oct. 8-12, 1995; [Record of the Industry Applications Conference (IAS)], New York, IEEE, US, vol. 2, pp. 1634-1640, 1995.

Dörstel Bernhard et al: "SPS-Know-How Aus Dem Werkzeugkasten", Elektrotechnik Fuer Die Automatisierung, Vogel Business Media Gmbh & Co.KG, vol. 79, No. 10, p. 24, 26, 1997, with machine translation.

Marcin Witczak. "Fault Diagnosis and Fault-Tolerant Control Strategies for Non-Linear Systems", Springer Lecture Notes in Electrical Engineering, vol. 266, Chapter 1, pp. 1-6, 2014.

Thomas, John, Francisco Luiz De Lemos and Nancy Leveson. "Evaluating the Safety of Digital Instrumentation and Control Systems in Nuclear Power Plants." http://sunnyday.mit.edu/papers/MIT-Research-Report-NRC-7-28.pdf; pp. 1-66, 2012.

\* cited by examiner

CONTROLLING METHODS, CONTROL SYSTEMS, AND PLANTS USING SEMANTIC MODELS FOR QUALITY CRITERIA OR ADAPTATION OF CONTROL RULES

The present patent document is a § 371 nationalization of PCT Application Serial No. PCT/EP2017/056969, filed Mar. 23, 2017, designating the United States, which is hereby incorporated by reference, and this patent document also claims the benefit of U.S. Provisional Patent Application No. 62/312,538, filed Mar. 24, 2016, which is also hereby incorporated by reference.

TECHNICAL FIELD

The disclosure relates to a controlling method, to a control system, and to a plant.

BACKGROUND

In industrial automation, large volumes of data from plants are captured by programmable logic controllers (PLC) and are transferred to so-called supervisory control and data acquisition (SCADA) systems.

It is known practice to automatically check the method of operation of controllers from time to time. For this purpose, it is regularly necessary to analyze the captured data. Enormous volumes of data need to be stored and analyzed for this purpose, which requires many resources. Therefore, the captured data may be stored and analyzed at later times.

However, the memory available for storing captured data may be limited in embedded programmable logic controllers.

SUMMARY AND DESCRIPTION

The object of the disclosure is therefore to provide a controlling method which is improved in this respect and makes it possible, in particular, to check its method of operation using captured data in an improved manner than previously known. Furthermore, the object of the disclosure is to provide an improved control system and an improved plant which may be used to carry out the method.

The scope of the present disclosure is defined solely by the appended claims and is not affected to any degree by the statements within this summary. The present embodiments may obviate one or more of the drawbacks or limitations in the related art.

The controlling method uses a control rule. In the method, the progression of the control process is at least partially observed and at least one quality criterion characterizing the quality of the control method is determined, that is to say ascertained, on the basis of this progression. In the method, the control rule is adapted on the basis of the quality criterion.

In particular, in the method, the progression of the control process is captured by capturing the progression at discrete and, in particular, successive intervals of time or continuously. The phrase "on the basis of the progression of the control process" may be understood as meaning "at least on the basis of the control process at the run time and/or on the basis of the control process at preceding, in particular successive, times or periods".

The method is suitably carried out in an automated manner, for instance in a computer-implemented and/or software-based manner.

The method makes it possible to observe the performance of the control method at the run time and to actively influence the control method itself in sync with the run time and to adapt the control method. For this purpose, the quality criterion or the quality criteria is/are evaluated at the run time and the control rule is changed on the basis of the quality criterion or the quality criteria, in particular if at least one quality criterion changes by a threshold value and/or at a threshold rate. Consequently, it is not absolutely necessary to explicitly stipulate in advance conditions or environmental changes which may change the quality criteria. Rather, the method may be used to react to unforeseen situations at the run time. The method consequently allows a control process which is particularly flexible and robust in comparison with the prior art. The quality criteria may not be fixedly stipulated in advance, but rather may be determined at the run time of the control process itself or may be flexibly adapted over the service life of the apparatus used to carry out the method.

In particular, in the method, the control rule is executed using a control unit. The control unit may be an integrated (e.g., "embedded") control unit. Integrated control units, in particular, regularly have a memory element which is expediently used to store at least one part of the progression of the control process in the method.

In the method, the progression of the control process may be observed using an adaptation unit and the determination of the quality criterion and the adaptation of the control rule are carried out using the adaptation unit. The control rule is expediently executed using a control unit which, although connected thereto using signaling, is functionally separate from the adaptation unit. In particular, the control unit and the adaptation unit may be formed with at least one separate processor or else with at least one separate processor core in each case. In this manner, the control process, on the one hand, and the observation of the control process and the determination of the quality criterion may be carried out in a completely parallel manner with respect to one another. This advantageously provides that the operation of the adaptation unit does not interfere with the operation of the control unit on account of otherwise shared use of resources.

In the method, the control process is expediently formed with a regulation process, in particular, with a PID regulation process. In the case of PID regulators, in particular, a dynamic regulation process with a high degree of stability may be obtained using the method.

The at least one quality criterion is suitably formed with a variability of a variable to be set by the control process or regulation process, in particular, a controlled variable. Alternatively, or additionally, the at least one quality criterion may be formed with a measure of the setting time of a variable to be controlled or regulated, (in particular, a controlled variable), or with a measure of a deviation, (for instance, an overshoot), during a setting phase or a measure of an oscillation (in particular, amplitude and/or frequency) during a setting phase of the variable to be controlled or regulated.

In one advantageous development of the method, a semantic model is used for the at least one quality criterion and/or for the adaptation. The semantic model advantageously has an ontology and/or at least one representation library. In a manner known per se, semantic models provide the possibility of linking knowledge from a multiplicity of different areas in a consistent manner, for instance, knowledge which is obtained during a simulation or from a parts list or from a work schedule for a product to be produced by the control process or from a maintenance report for the plant.

In one development of the method, the progression of the control process is captured in the time domain. In addition, the at least one quality criterion may be determined in the time domain and/or the control rule is adapted in the time domain.

The method may be carried out in order to control a production plant.

In the method, the control rule is expediently executed using a control unit, wherein at least one state of the control unit is used for the quality criterion and/or as an input variable for the control rule.

The method may be carried out in order to control a plant, wherein at least one state of the plant is used for the quality criterion and/or as an input variable for the control rule.

In the method, a context model of the control method is suitably used, which context model includes a semantic model, in particular, having at least one ontology and/or at least one representation library. The at least one quality criterion may be formed on the basis of the context model of the control method. The control method may be advantageously analyzed and dissected in a particularly simple manner on the basis of the context model, with the result that practical quality criteria may be easily derived in an automated manner from stability considerations, in particular. Semantic models of the control method may therefore also be advantageously used to carry out the method, with the result that semantic models which have been developed once may be simultaneously used both for the control process itself and to adapt the control process.

The method may be carried out in order to control a plant, wherein a context model of the plant is used, which context model includes a semantic model, in particular, having at least one ontology and/or at least one representation library. Quality criteria may therefore be easily derived from the semantic model of the plant, for instance, in such a manner that the quality criterion or quality criteria provide(s) that boundary conditions of the plant to be controlled may be reliably complied with.

In addition, specifications for output variables of the control process and/or specifications of the input variables of the control process may be used for one or more of the above-mentioned context models, for instance—if present— sensor measured values and/or specifications of rules which influence control signals and/or sensor signals, for instance, and/or specifications of state transitions which stipulate, in particular, what states and conditions in the form of measured values entail what state transitions.

These specifications are obtained from a model for the control method, in particular, a semantic model of the control method, which may include one or more ontologies and/or one or more representation libraries.

The control system has at least one control unit designed for control by a control rule and at least one adaptation unit. The at least one adaptation unit is designed to at least partially observe the progression of the control process and to determine a quality criterion characterizing the quality of the control method. In this case, in the control system, the adaptation unit is designed to adapt the control rule on the basis of the quality criterion. The control system is suitably designed to carry out the method as described above.

In the control system, the control unit may be an integrated (e.g., "embedded") control unit. Integrated control units, in particular, regularly have a memory element which may expediently store the progression of the control process, with the result that this stored progression may be easily made available to the adaptation unit by a signal connection or signal transmission.

The control unit and the adaptation unit may be formed with at least one separate processor or with at least one separate processor core in each case. This provides that the adaptation unit does not block any resources provided for the control process. Furthermore, it may thus be provided that the observation of the control process and the determination of the quality criterion and the adaptation of the control rule are possible at any time at the run time and are not interrupted, for instance, in the event of utilization of the computing capacity by the control unit.

In the control system, the control process is expediently a regulation process, in particular, a PID regulation process. The control unit of the control system may include a PID regulator.

The plant is a production plant, for example. The plant has a control system as described above.

BRIEF DESCRIPTION OF THE DRAWINGS

The disclosure is explained in more detail below on the basis of an exemplary embodiments illustrated in the drawings, in which.

DETAILED DESCRIPTION

Figure 1:
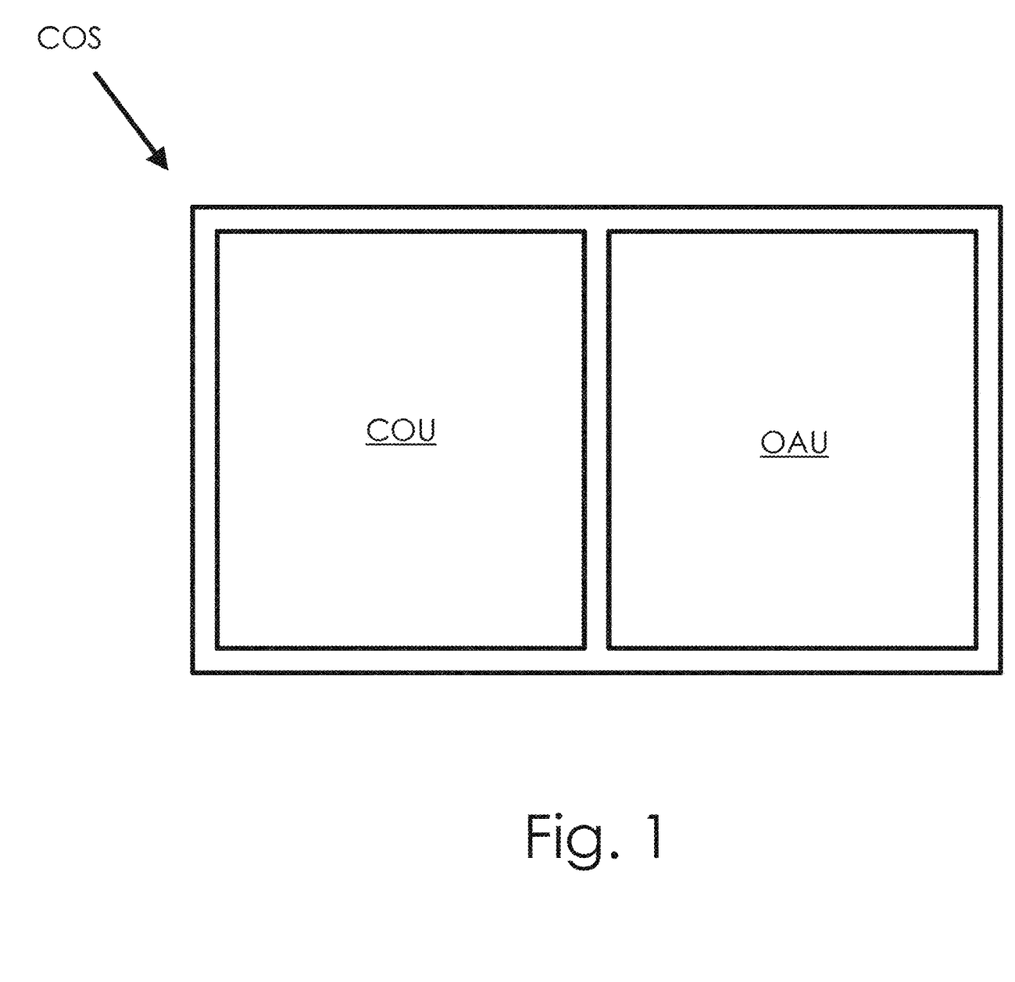
FIG. 1 schematically depicts an example of a structure of a control system having a control unit and an observation and adaptation unit for carrying out a controlling method.

The control system COS is an embedded, that is to say integrated, control system COS and includes, as illustrated in FIG. 1, a control unit COU in the form of a microprocessor set up for the control process. The control system COS also includes an observation and adaptation unit OAU, the function of which is described in more detail below. The observation and adaptation unit OAU is also implemented with an accordingly configured, that is to say programmed, microprocessor. In principle, the control unit COU and the observation and adaptation unit OAU may each be implemented as one or more cores of a single processor in further exemplary embodiments which are not specifically illustrated.

A control algorithm, that is to say a control rule, is implemented in the control unit COU and is used by the control unit COU to form a software-based PID regulator. The control unit COU is described in more detail below.

The observation and adaptation unit OAU is designed to observe and adapt the control method carried out using the control unit COU. The observation and adaptation unit OAU is specified in more detail in FIG. 2.

Figure 2:
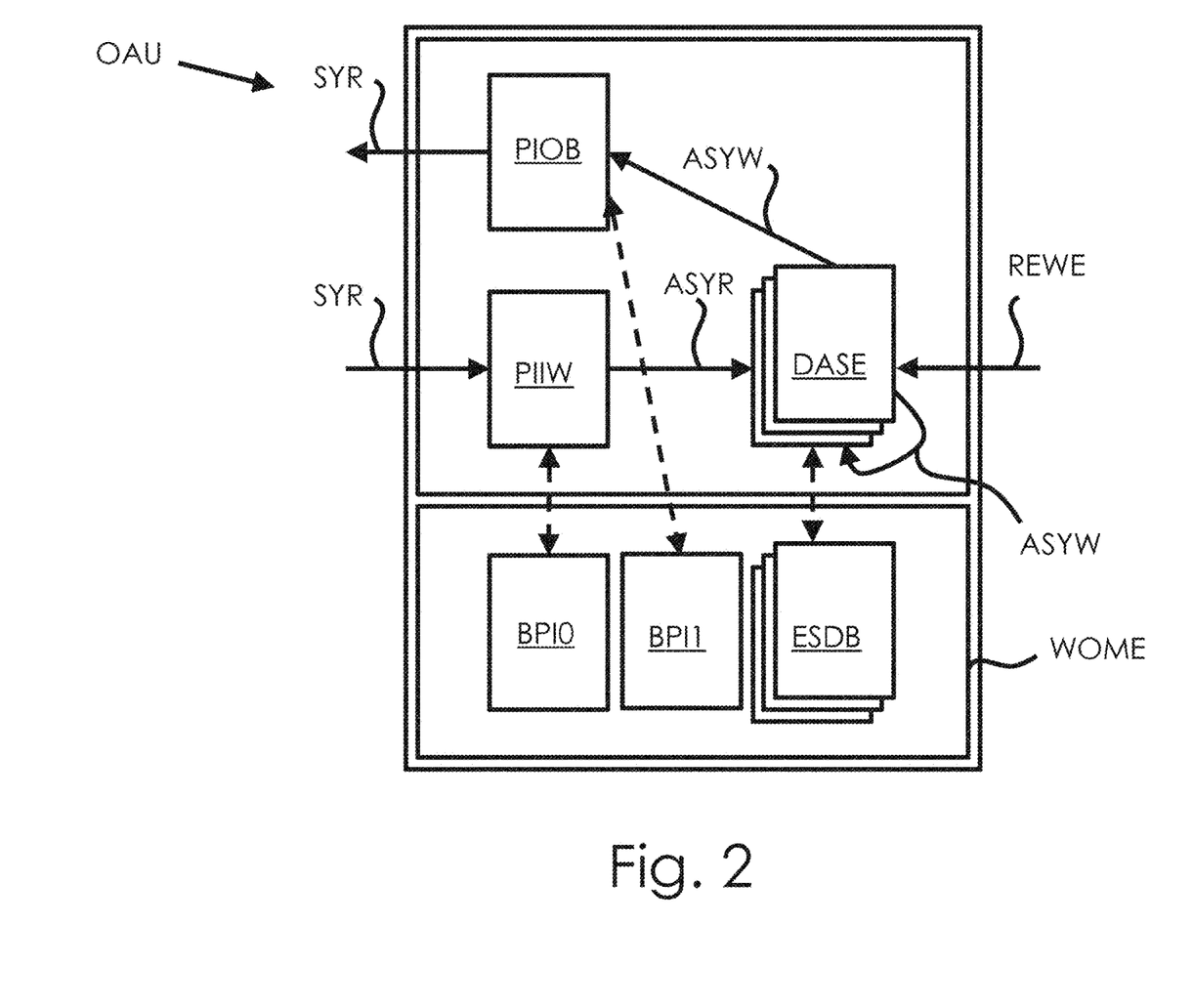
FIG. 2 schematically depicts an example of a signal flow of the observation and adaptation unit according to FIG. 1.

The observation and adaptation unit OAU receives, via an input interface, a data flow SYR, which is in sync with the run time, from the current control rule of the control method of the control unit COU. This data flow SYR is formed with respectively currently captured images PIIW of the control method. The currently captured images PIIW include the current input variables and output variables of the control unit COU and are kept available in their temporal sequence, as a history of images BPI0, BPI1, in a main memory WOME of the observation and adaptation unit OAU. A data stream evaluator DASE accesses this history of images BPI0, BPI1 and, by information REWE relating to the task on which the control method is based, reads in and evaluates the data stream of the images BPI0, BPI1 by asynchronous reading operations ASYR and adapts the control method from time to time, that is to say by an asynchronous writing process ASYW. The data stream evaluator DASE also keeps available evaluation data ESDB in the main memory WOME of the observation and adaptation unit OAU for this purpose. The control method of the control unit COU is adapted by the data stream evaluator DASE in such a manner that the data stream evaluator DASE establishes a wanted desired image POIB of the control method on the basis of quality criteria described in more detail below and then transmits the desired image PIOB to the control unit COU by a data flow SYR in sync with the run time. The control unit COU accepts the desired image PIOB as the current control rule. The control method is accordingly adapted by accepting the desired image PIOB as the current control rule.

Figure 3:
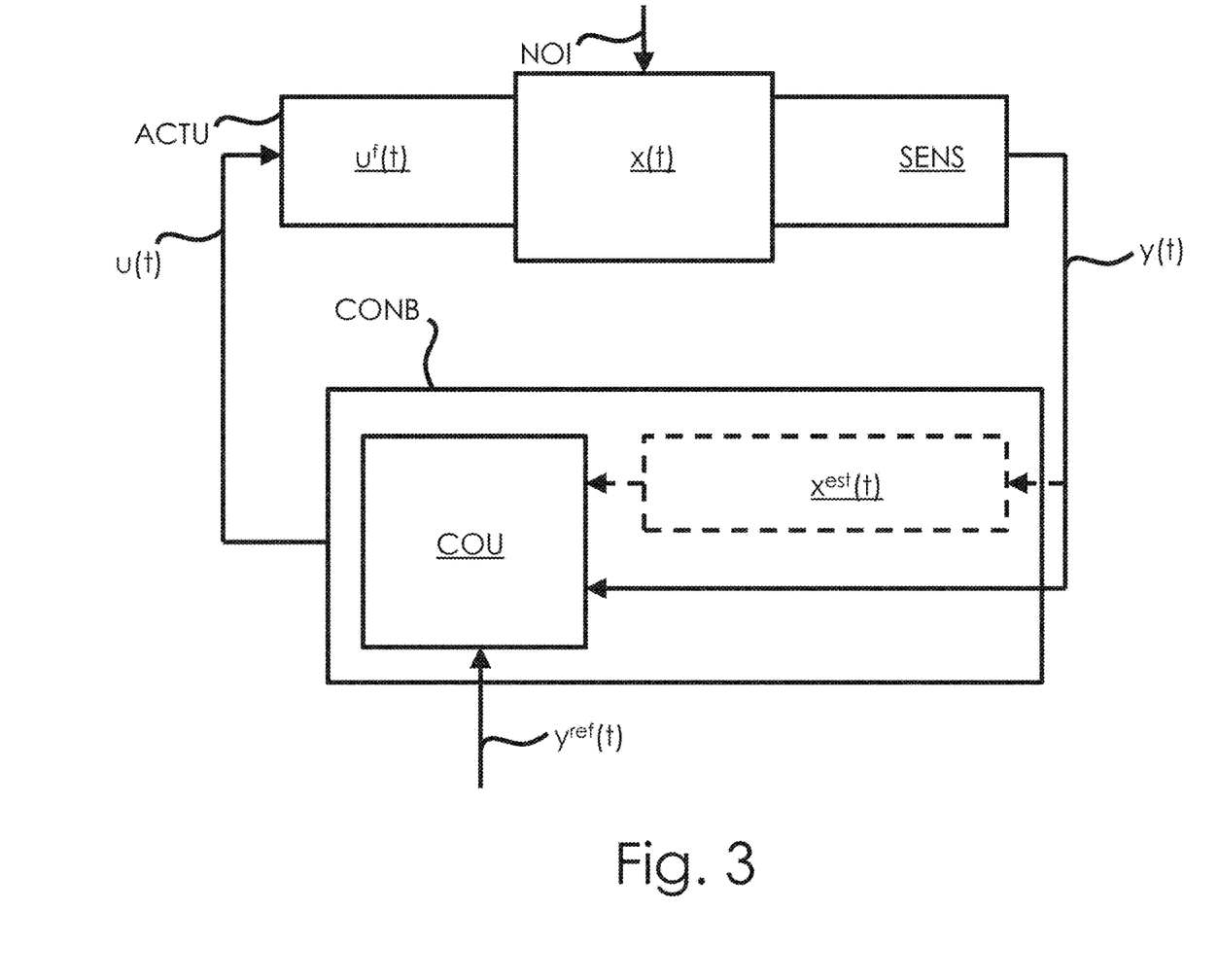
FIG. 3 schematically depicts a part of the signal flow of the control unit according to FIG. 1 in a signal flow diagram.

The control method of the control unit COU is a regulation method known per se in the form of a software-based PID regulation process of a plant, as shown in FIG. 3. In the exemplary embodiment shown, the plant is a production plant (in further exemplary embodiments which are not specifically illustrated, the control method may be in the form of a control method for other plants or processes). The control method complies with the control model explained below.

In order to carry out the control method, the control unit COU outputs a time-dependent control signal u(t) according to its currently implemented control rule, which control signal causes actuators ACTU, production means in the exemplary embodiment shown, to act according to a time-dependent function $u^F(t)$. The action of the actuators according to the function $u^F(t)$ changes the plant to a state x(t). The state x(t) may not solely depend on the function $u^F(t)$, but rather interfering influences and stochastic influences NOI which influence the state x(t) of the production plant in an uncontrollable manner may be additionally taken into account.

Sensors SENS capture the state x(t) of the plant as measured values y(t). The sensors are connected to a state estimator $x^{est}(t)$ using signaling, which state estimator, together with the control unit COU, is part of a control assembly CONB. An estimation function is implemented in the state estimator $x^{est}(t)$ and estimates a state of the plant from the measured values y(t), which state itself is not directly accessible to a measurement.

This state is transmitted to the control unit COU together with the measured values y(t) themselves. The control unit COU also receives reference values $y^{ref}(t)$ for the measured values y(t) which are compared with these reference values $y^{ref}(t)$ in order to determine a system deviation. The control unit COU determines new control signals u(t) using its control rule on the basis of these measured values y(t) and the reference values $y^{ref}(t)$ and the states of the plant estimated by the state estimator $x^{est}(t)$.

In the exemplary embodiment shown, the state estimator $x^{est}(t)$ is part of the control method itself and is not part of the observation and adaptation unit OAU.

The control model explained above consequently describes the variables mentioned below.

On the one hand, the control model describes the control unit COU and the input and output variables which are transmitted to the control unit COU or are provided by the latter, here the measured values y(t) and the control signals u(t), for example.

The control model also describes variables describing the time behavior of the system, here the states of the plant which may not be directly measured.

In addition to the variables of the control model which are illustrated in FIG. 3 and have been explained above, further variables which do not belong to the control model and by which the observation and adaptation unit OAU operates may be used in the method in further exemplary embodiments.

Such variables are, on the one hand, quality criteria (e.g., "Key performance indicators", KPIs) which stipulate a desired quality of the control rule.

Furthermore, it is possible to provide warning signals which occur during the evaluation of input and output variables and/or states of the plant in sync with the run time and expediently indicate deviations from desired states and/or violated quality criteria.

It is also possible to use causal relationships of variables of the control model and such warning signals, for instance from a semantic model.

It is also possible to use dependencies between various components of the control model. Such dependencies are expediently derived from explicit knowledge of the production method carried out with the plant and/or explicit knowledge of the structure of the plant and/or a hierarchy of its components and/or a correlation analysis of various components of the control model.

In this case, the basis for the method of operation of the observation and adaptation unit OAU is formed by the control model of the control unit and expediently additionally the context in which the control model lies and which is represented in a context model of the control method. The control model and the context model (which may contain the control model, for example) may now be used to optimize and adapt the control method.

For example, such a context model is present as a semantic model, in particular in the form of a representation library and/or ontology, as described below, for example. The context model may be easily analyzed on the basis of such an ontology and may be used to adapt and/or optimize the control method. For this purpose, the context model expediently includes as much knowledge of the control method as possible and represents this knowledge in a manner known per se by objects, relationships, and procedures. For example, the knowledge comes from the control method itself and also expediently simulations of the control method and/or a plant controlled by the control method and/or the specification of a product produced with a plant controlled by the control method and/or maintenance reports for the plant and/or specifications of environmental conditions and/or quality checks of a produced product or of the plant, for instance.

Figure 4:
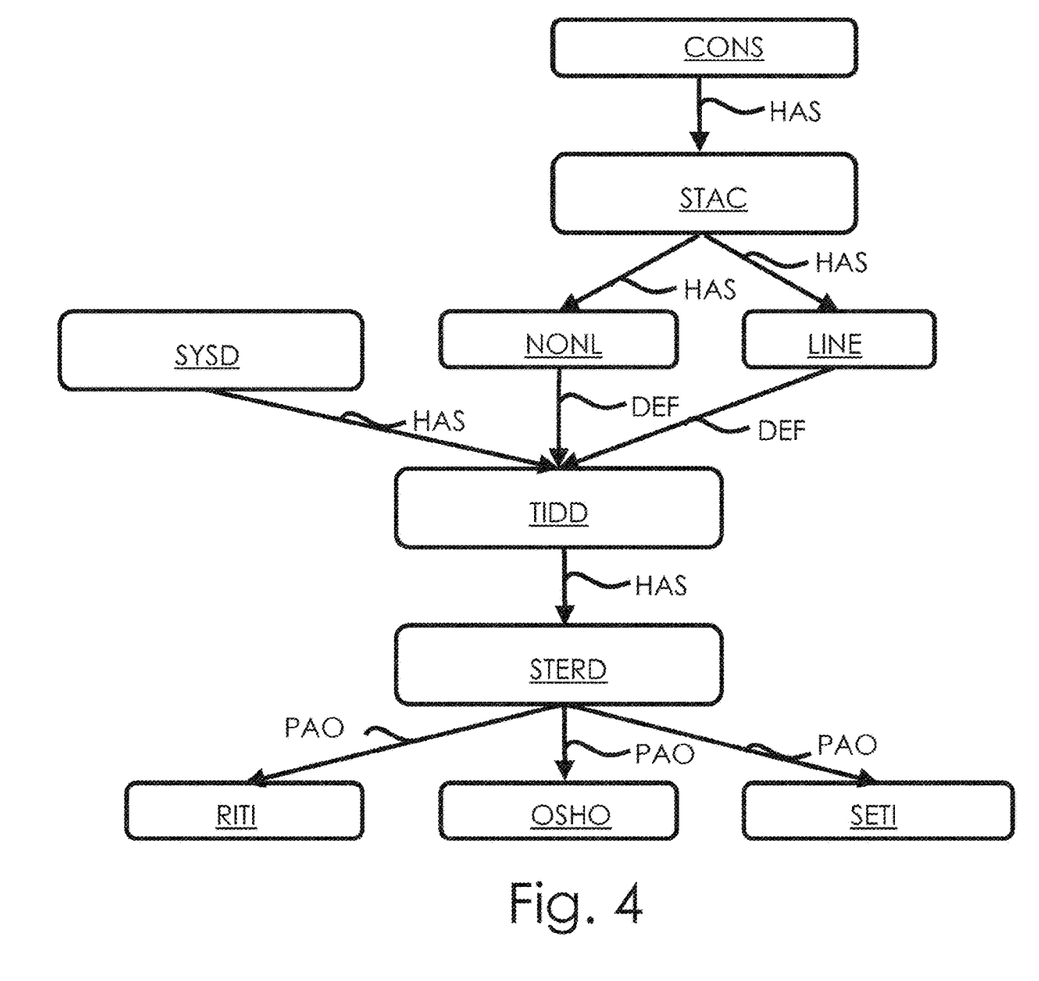
FIG. 4 schematically depicts a section of a basic sketch of a context model of the control unit according to FIGS. 1 and 3 of the control system according to FIG. 1.

The context model illustrated in FIG. 4 includes a semantic description CONS of the control method in the form of a control model and a semantic description SYSD of the control unit COU. The semantic description CONS has a subclass which forms a continuous-state description of the control method. The relationship "has a subclass" is indicated by arrows HAS in FIG. 4. The control method is segmented into the subclasses with non-linear components NONL of the control method and with linear components LINE of the control method.

Both the non-linear components NONL of the control method and the linear components LINE of the control method influence (indicated in FIG. 4 as the relationship "defines" by the arrows DEF) a description of the control unit COU in the time domain TIDD. The description of the control unit COU in the time domain TIDD also depends on the semantic description SYSD of the control unit COU itself.

The description of the control unit COU in the time domain TIDD has, as a subclass, a response STERD which describes the response of the control unit COU to a control act of the control method. The response STERD in each case forms some (the relationship "is part of" is indicated by arrows PAO) quality criteria which are present as a rise time RITI of a variable to be controlled and as an overshoot OSHO of this variable beyond a reference value $y^{ref}(t)$ and as a decay time SETI of a deviation of this variable from a desired value.

These quality criteria form assessment criteria for the quality of the method of operation of the control unit COU. Alternatively, or additionally, the following quality criteria may be used in further exemplary embodiments which are not specifically illustrated: (1) the variability of the control method, in particular a standard deviation of a deviation from the desired value, and/or (2) a percentage of the operating time of the plant which is allotted to manual operation, and/or (3) a temporal integral of one or more of the above-mentioned quality criteria.

An in-depth analysis, (e.g., a fault analysis or an analysis for the purpose of possible optimization of the control method), requires further information relating to causal relationships of variables of the control method and, in certain examples, variables of the plant. In the exemplary embodiment illustrated, such information relating to causal relationships is obtained from the semantic description CONS of the control method.

Figure 5:
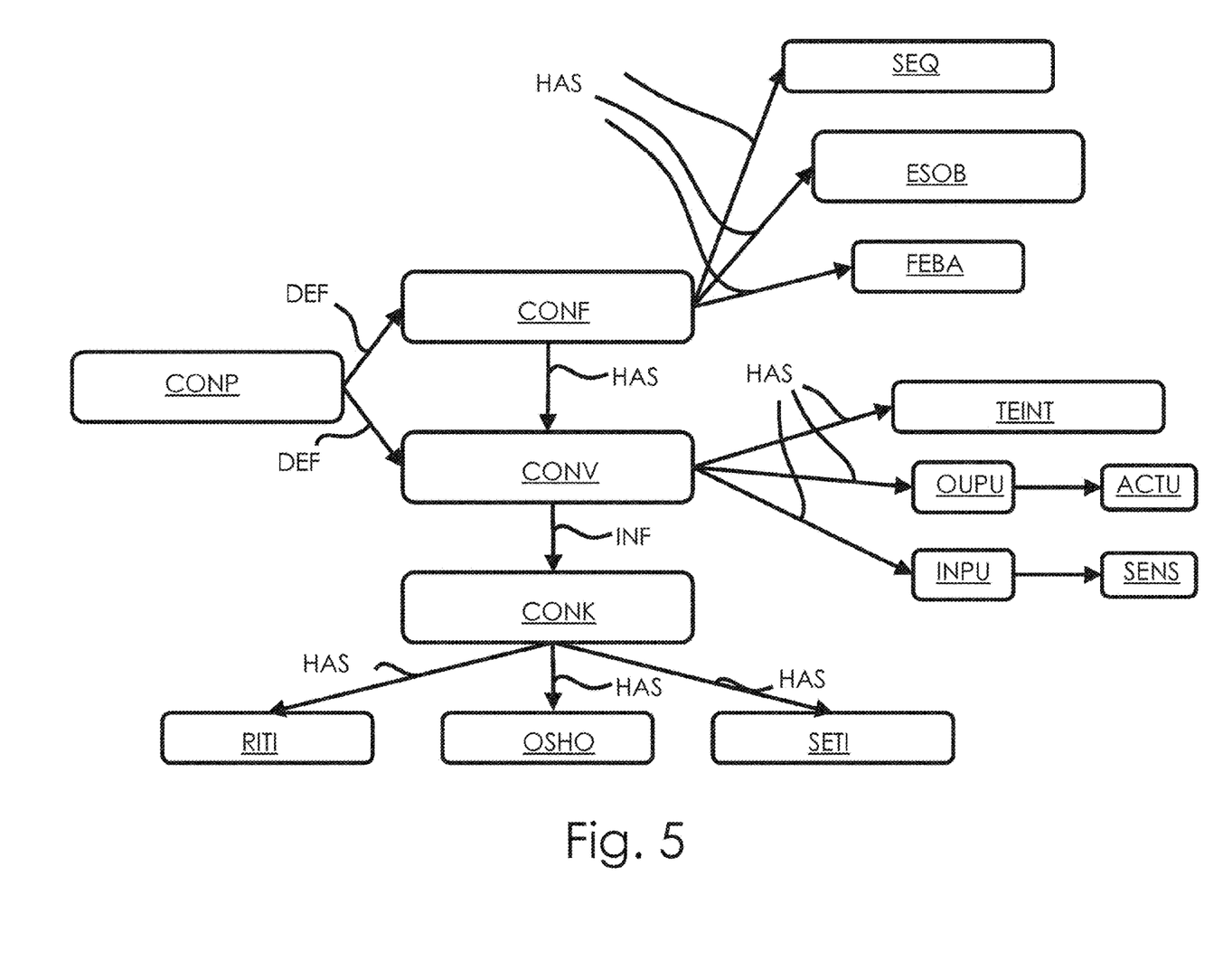
FIG. 5 schematically depicts an example of a section of a context model of a controlling method by the control system according to FIG. 1 and FIG. 4.

As illustrated in FIG. 5, the control method includes a control algorithm CONP which defines control functions CONF and control variables CONV (the relationship "defines" is indicated by arrows DEF). In this case, the control variables CONV are part of the control functions CONF (the relationship "has a subclass" is indicated by arrows HAS).

The control functions CONF include sequence control processes SEQ and estimation functions ESOB for estimating states of the plant as well as feedback functions FEBA.

The control variables CONV include, for instance, temporary or internal variables TEINT, for example, temporal dynamics of the control device COU, in particular, the value of an integrating part of the PID regulator, or the temporal dynamics of the plant determined, for instance, by an estimation function or a sensor.

The control variables CONV also include input variables INPU and output variables OUPU, for instance, output for the purpose of controlling actuators ACTU or received from the sensors SENS.

The manner in which the control functions CONF relate different control variables CONV to one another defines implicit relationships between the control variables CONV. Such relationships and dependencies become transparently visible in the context model and may be used for observation and adaptation carried out.

The control variables CONV form input variables (the relationships "input variable for" are indicated by arrows INF) for quality criteria CONK which, as already explained on the basis of FIG. 4, are present as a rise time RITI, the overshoot OSHSO and a decay time SETI.

For the above-mentioned context models, it is also possible to use specifications for the output variables of the control unit COU and specifications of the input variables of the control unit COU, for instance, measured values from sensors, specifications of rules relating to which control signals influence which sensor signals, and specifications of state transitions which stipulate, in particular, what states and conditions in the form of measured values entail what state transitions.

These specifications are obtained from a model for the control method, in particular, a semantic model of the control method which may have one or more ontologies and/or one or more representation libraries.

In the exemplary embodiment explained here, the plant is a production plant and has a control system, as described above.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A control method by a control rule executed by a controller, the control method comprising:
    at least partially observing, by the controller, a progression of a control process captured in a time domain;
    determining, by the controller, a quality criterion characterizing a quality of the control method based on the progression, wherein a semantic model of the control method is used for the quality criterion, an adaptation of the control rule, or both the quality criterion and the adaptation, wherein the semantic model of the control method comprises non-linear components and linear components, wherein a description of the controller in the time domain is defined by both the non-linear components and the linear components of the semantic model of the control method and a semantic description of the controller itself, wherein the description of the controller in the time domain comprises a response of the controller to a control act of the control method, the response having the quality criterion present as one or more variables to be controlled, and wherein the one or more variables of the response comprise a rise time, an overshoot beyond a reference value, a decay time of a deviation from a desired value, or a combination thereof;
    adapting, by the controller, the control rule based on the quality criterion; and controlling, by the controller, a plant using the adapted control rule, wherein the controller causes an actuator of the plant to implement a change to the plant using the adapted control rule.

2. The control method of claim 1, wherein the control process is formed with a regulation process.

3. The control method of claim 1, wherein the quality criterion is determined in the time domain, the control method is adapted in the time domain, or the quality criterion is determined in the time domain and the control method is adapted in the time domain.

4. The control method of claim 1,
wherein the plant is a production plant.

5. The control method of claim 1, wherein at least one state of the controller is used for the quality criterion, as an input variable for the control rule, or for the quality criterion and as the input variable for the control rule.

6. The control method of claim 1,
wherein at least one state of the plant is used for the quality criterion, as an input variable for the control rule, or for the quality criterion and as the input variable for the control rule.

7. The control method of claim 1,
wherein a context model of the plant is used, and
wherein the context model comprises the semantic model.

8. The control method of claim 2, wherein the regulation process is PID regulation process.

9. The control method of claim 2, wherein the semantic model comprises at least one ontology or at least one representation library.

10. The control method of claim 1, wherein the semantic model comprises at least one ontology or at least one representation library.

11. The control method of claim 7, wherein the semantic model comprises at least one ontology or at least one representation library.

12. The control method of claim 1, wherein the quality criterion comprises a percentage of an operating time of the plant that is allotted to manual operation.

13. The control method of claim 1, wherein the quality criterion forms an assessment criterion for the quality of the control method.

14. The control method of claim 1, wherein the progression of the control process is captured continuously, and
wherein the semantic model provides a continuous-state description of the control method.

15. A control system comprising:
a controller configured to:
control a control process by a control rule;
at least partially observe a progression of the control process captured in a time domain;
determine a quality criterion characterizing a quality of a control method, wherein a semantic model of the control method is used for the quality criterion, an adaptation of the control rule, or both the quality criterion and the adaptation, wherein the semantic model of the control method comprises non-linear components and linear components, wherein a description of the controller in the time domain is defined by both the non-linear components and the linear components of the semantic model of the control method and a semantic description of the controller itself, wherein the description of the controller in the time domain comprises a response of the controller to a control act of the control method, the response having the quality criterion present as one or more variables to be controlled, and wherein the one or more variables of the response comprise a rise time, an overshoot beyond a reference value, a decay time of a deviation from a desired value, or a combination thereof;
adapt the control rule based on the quality criterion; and
control a plant using the adapted control rule, wherein the controller causes an actuator of the plant to implement a change to the plant using the adapted control rule.

16. A plant comprising:
a control system having a controller configured to:
control a control process by a control rule;
at least partially observe a progression of the control process captured in a time domain;
determine a quality criterion characterizing a quality of a control method, wherein a semantic model of the control method is used for the quality criterion, an adaptation of the control rule, or both the quality criterion and the adaptation, wherein the semantic model of the control method comprises non-linear components and linear components, wherein a description of the controller in the time domain is defined by both the non-linear components and the linear components of the semantic model of the control method and a semantic description of the controller itself, wherein the description of the controller in the time domain comprises a response of the controller to a control act of the control method, the response having the quality criterion present as one or more variables to be controlled, and wherein the one or more variables of the response comprise a rise time, an overshoot beyond a reference value, a decay time of a deviation from a desired value, or a combination thereof;
adapt the control rule based on the quality criterion; and
control the plant using the adapted control rule, wherein the controller causes an actuator of the plant to implement a change to the plant using the adapted control rule.

* * * * *